(12) United States Patent
Morinaga (10) Patent No.: US 7,111,945 B2
(45) Date of Patent: Sep. 26, 2006

(54) PROJECTOR

(75) Inventor: Kenichi Morinaga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 260 days.

(21) Appl. No.: 10/894,600

(22) Filed: Jul. 20, 2004

(65) Prior Publication Data

US 2005/0024601 A1    Feb. 3, 2005

(30) Foreign Application Priority Data

Jul. 28, 2003    (JP)    ............... P.2003-202292

(51) Int. Cl.
*G03B 21/20*    (2006.01)

(52) U.S. Cl. ............... 353/87; 348/794; 348/745; 353/119

(58) Field of Classification Search ............... 353/97, 353/119, 102, 87, 100, 101; 348/794, 798, 348/745; 362/581, 277, 368, 374, 375, 523, 362/528, 538, 546, 549, 362, 365; G03B 21/20
See application file for complete search history.

(56) References Cited

U.S. PATENT DOCUMENTS

| 6,056,405 | A * | 5/2000 | Heintz et al. ............... 353/85 |
| 6,969,175 | B1 * | 11/2005 | Takemi ............... 353/87 |
| 7,018,082 | B1 * | 3/2006 | Liu et al. ............... 362/548 |
| 2002/0075687 | A1 * | 6/2002 | Payne ............... 362/362 |
| 2004/0223125 | A1 * | 11/2004 | Tamaru et al. ............... 353/119 |

FOREIGN PATENT DOCUMENTS

JP    2001-215618    8/2001

OTHER PUBLICATIONS

Patent Abstracts of Japan, Publication No. 2001-215618, Date of Publication: Aug. 10, 2001 (1 page).

* cited by examiner

*Primary Examiner*—W. B. Perkey
*Assistant Examiner*—Andrew Sever
(74) *Attorney, Agent, or Firm*—Osha Liang LLP (57) ABSTRACT

A projector includes a resin-made lamp case in which a light source lamp is fitted and a metal-made optical part holder in which an optical part is fitted. Preferably, the lamp case includes a positioning boss, the optical part holder includes a resin-made lamp case holder which accommodates the lamp case, a tubular light tunnel which shapes a form of light, a cylindrically shaped portion having a guide hole into which the positioning boss is inserted, and a resiliently deformable detent member, a metal-made light-tunnel fixing member, the detent member is substantially U-shaped and is provided integrally on the light-tunnel fixing member, the cylindrically shaped portion has a slot portion into which the detent member is inserted and which extends from an outer peripheral surface to the guide hole, and the positioning boss has a concave engaging portion which is engaged with the detent member.

17 Claims, 11 Drawing Sheets

PROJECTOR

BACKGROUND OF THE INVENTION

1. Field of the Invention

The present invention relates to a projector, and more particularly to a projector having a light source lamp.

2. Description of the Related Art

A projector for forming an optical image corresponding to image information by optically processing the light emitted from a light source lamp is conventionally known (e.g., refer to JP-A-2001-215618).

Figure 9:
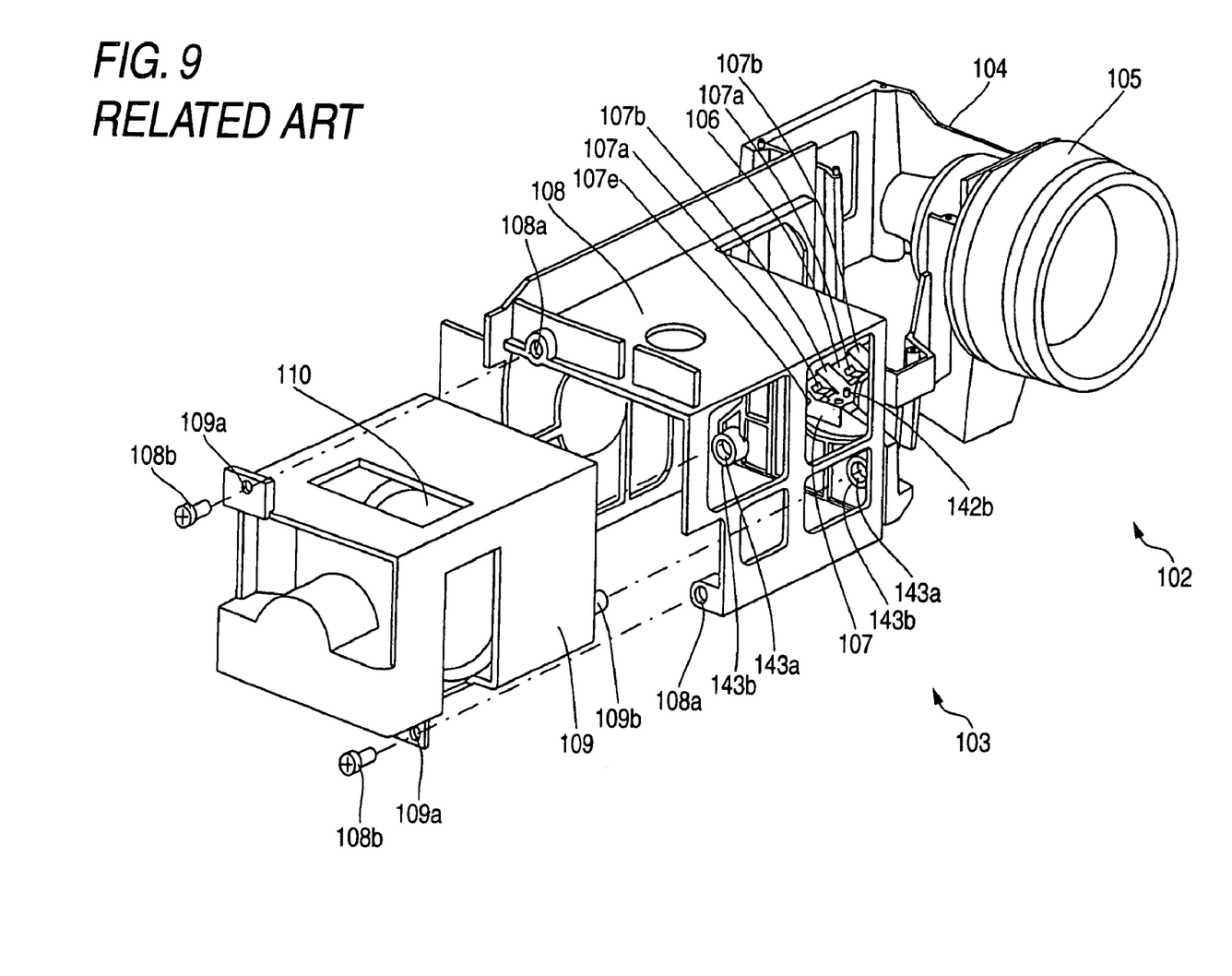
FIG. 9 is an exploded perspective view showing a projection section and a light source section of a conventional projector.
Figure 10:
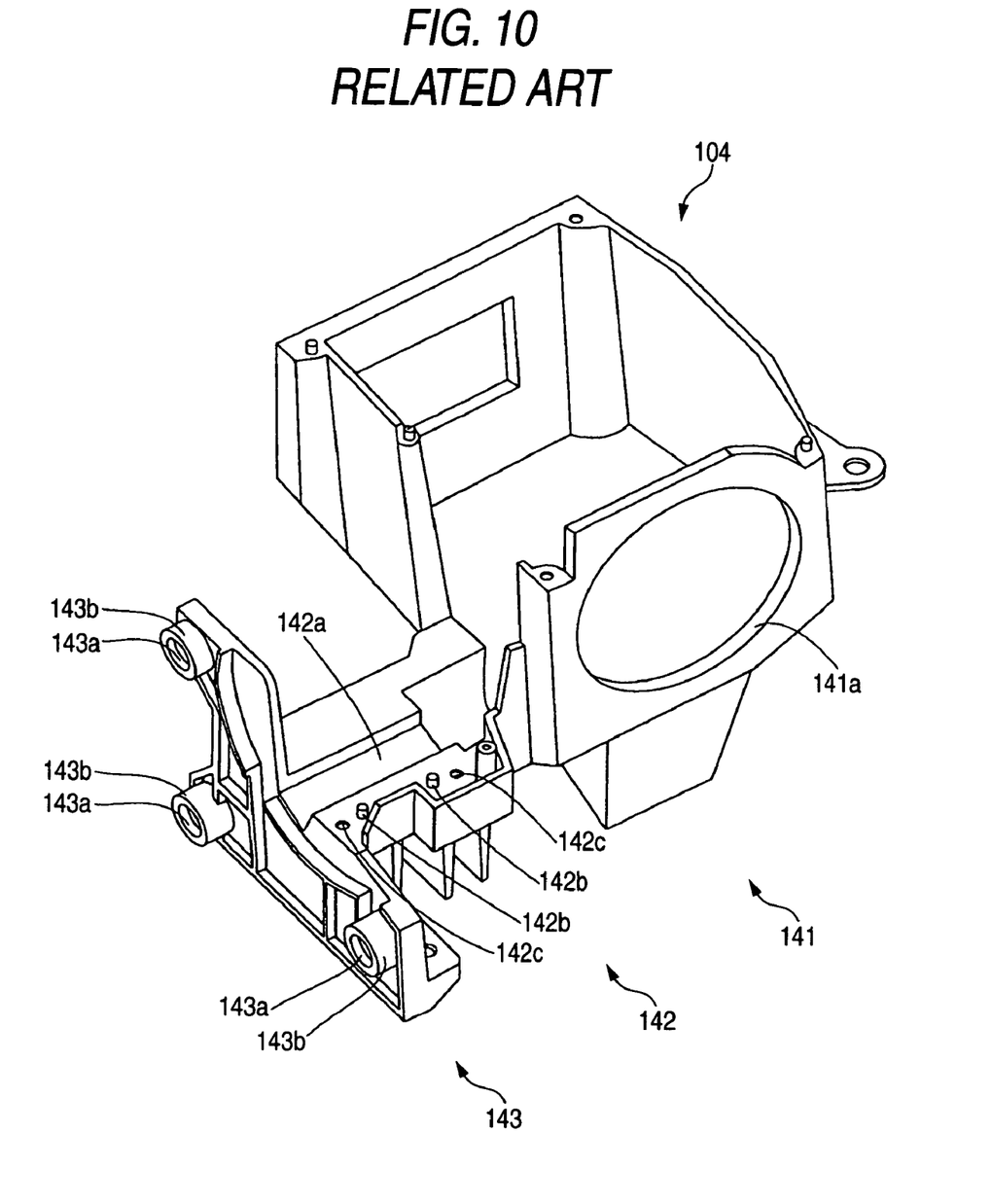
FIG. 10 is a perspective view of a casting of the conventional projector shown in FIG. 9.
Figure 11:
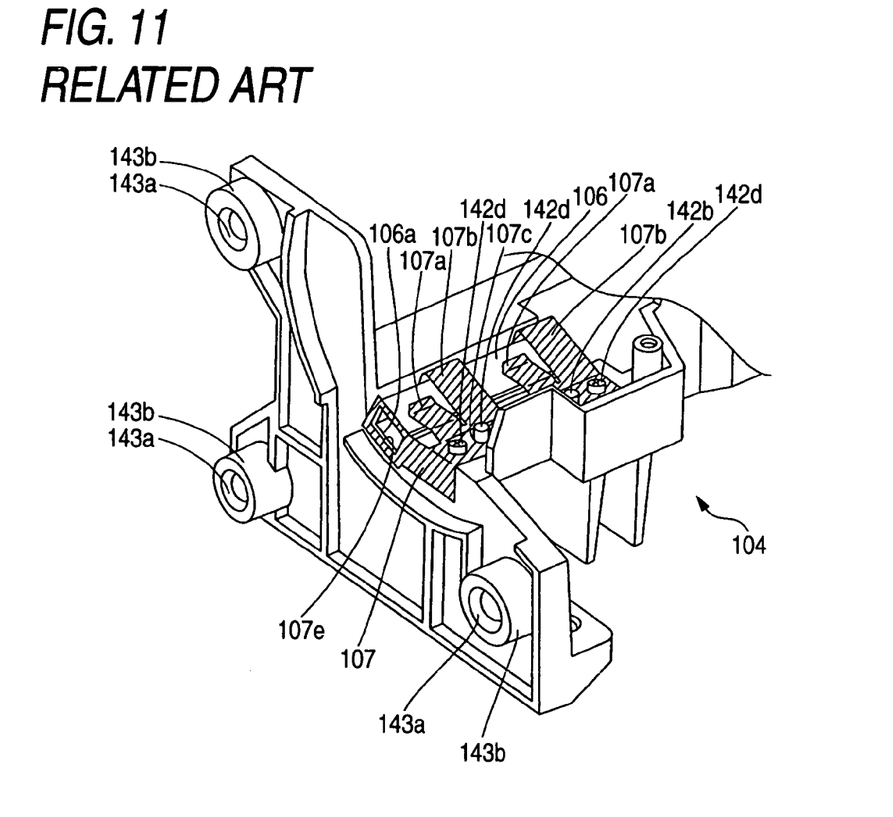
FIG. 11 is an enlarged perspective view of a light tunnel and its vicinities of the conventional projector shown in FIG. 9.
Figure 12:
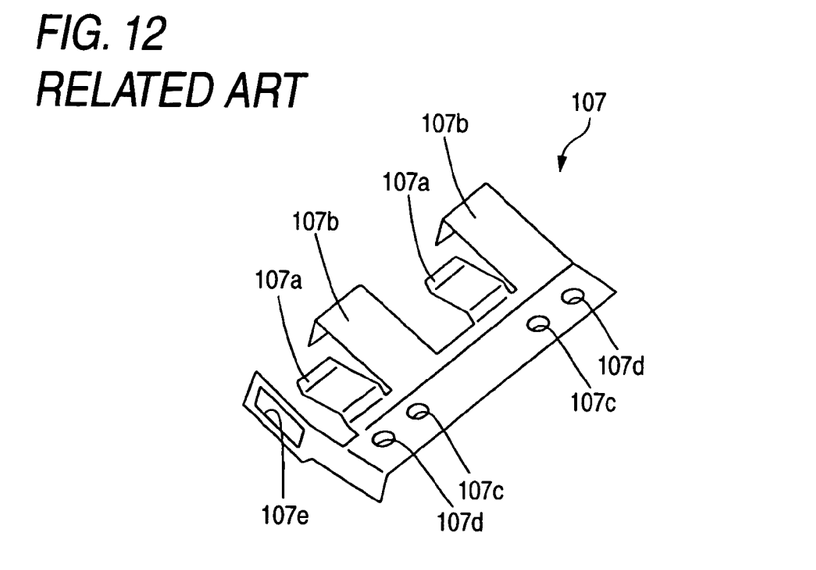
FIG. 12 is a perspective view of a light tunnel clip of the conventional projector shown in FIG. 9.
Figure 13:
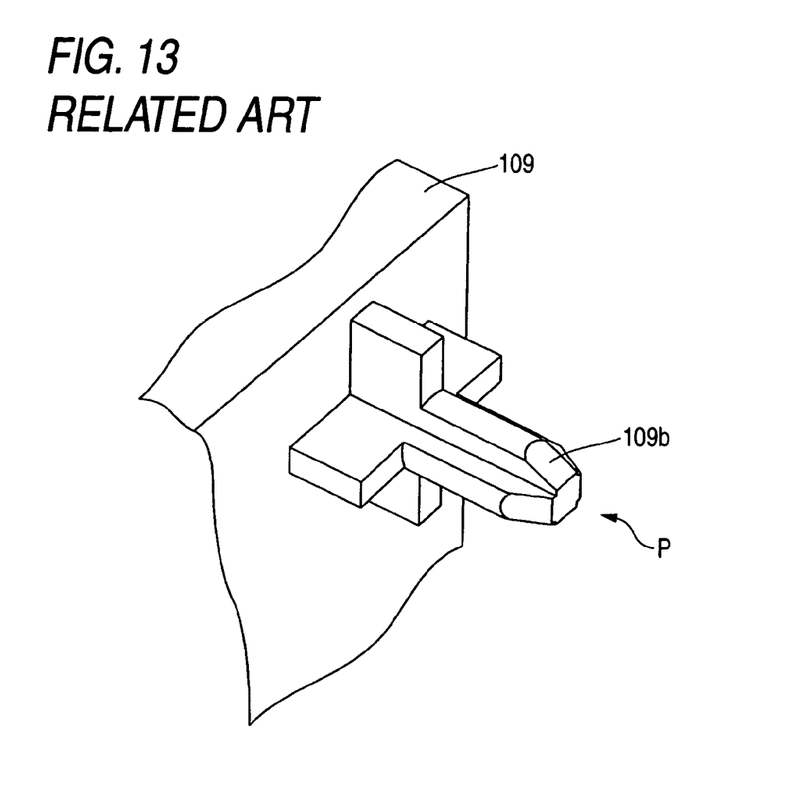
FIG. 13 is an enlarged perspective view of a positioning boss of a lamp case of the conventional projector shown in FIG. 9.
Figure 14:
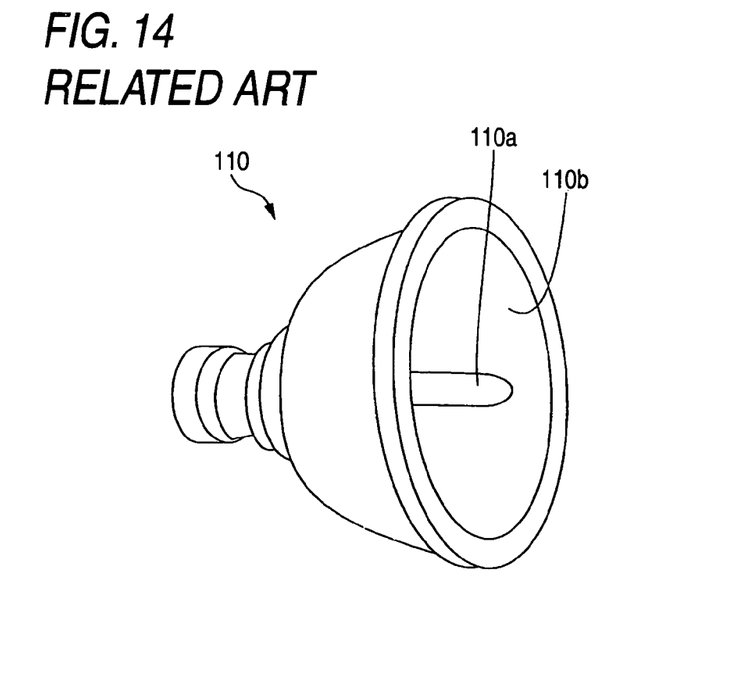
FIG. 14 is a perspective view of a light source lamp of the conventional projector shown in FIG. 9.
Figure 15:
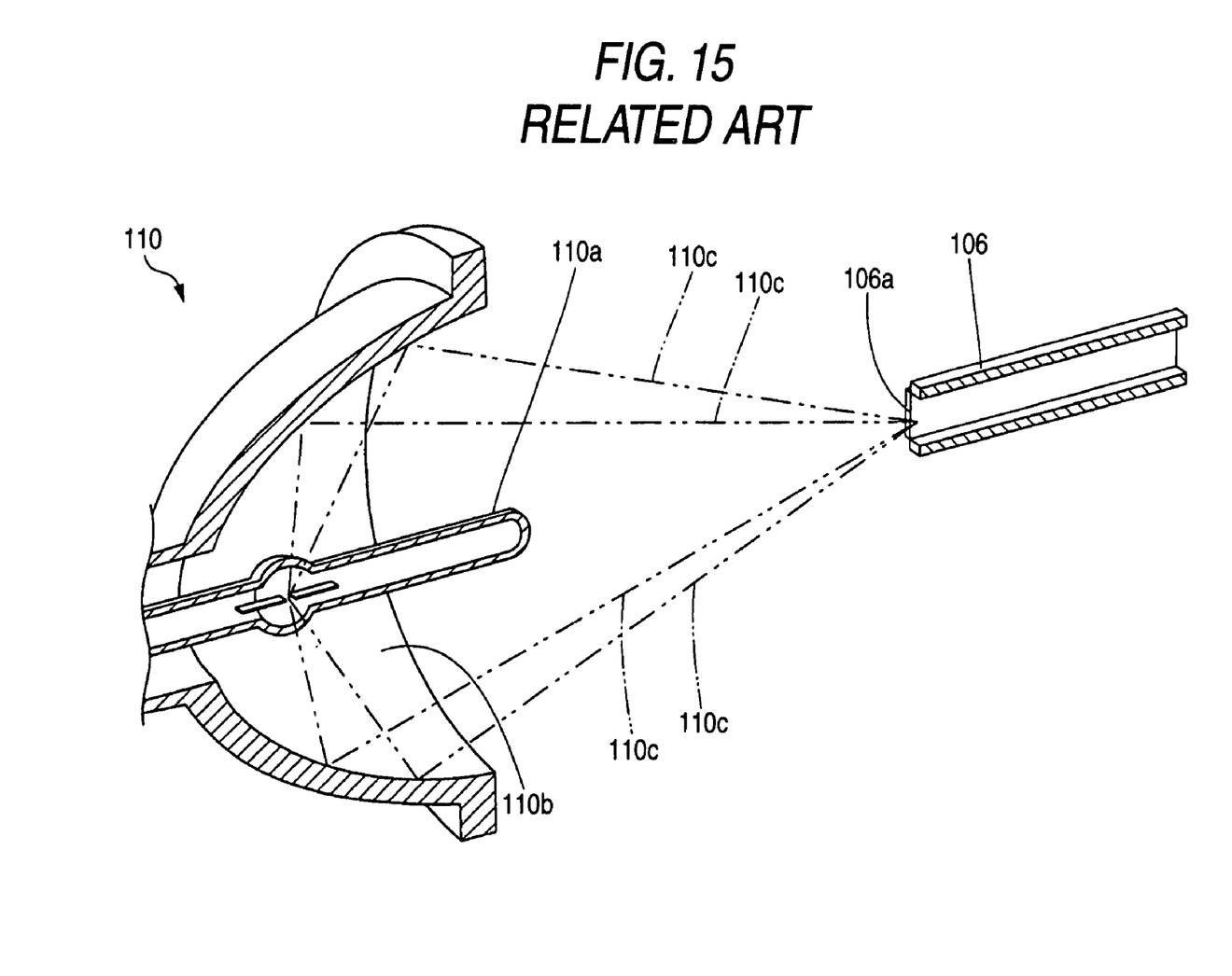
FIG. 15 is a cross-sectional view for explaining the relationship between the emitted light from the light source lamp and the light tunnel.

FIG. 9 is an exploded perspective view showing a projection section and a light source section of a conventional projector, and FIG. 10 is a perspective view of a casting of the conventional projector shown in FIG. 9. FIG. 11 is an enlarged perspective view of a light tunnel and its vicinities of the conventional projector shown in FIG. 9. FIG. 12 is a perspective view of a light tunnel clip of the conventional projector shown in FIG. 9. FIG. 13 is an enlarged perspective view of a positioning boss of a lamp case of the conventional projector shown in FIG. 9. FIG. 14 is a perspective view of a light source lamp of the conventional projector shown in FIG. 9. FIG. 15 is a cross-sectional view for explaining the relationship between the emitted light from the light source lamp and the light tunnel. First, referring to FIGS. 9 to 15, a description will be given of the structure of the conventional projector.

As shown in FIG. 9, the conventional projector has a projection section 102 and a light source section 103 provided inside the apparatus. A casting 104 is provided in the projection section 102. As shown in FIG. 10, this casting 104 has a lens mounting portion 141, a light tunnel fitting portion 142, and a guide portion 143. The lens mounting portion 141 is provided with a circular lens-attaching hole portion 141a. Further, the light tunnel fitting portion 142 is provided with a slot portion 142a having side surfaces and a bottom surface inclined by a predetermined angle, two positioning bosses 142b, and two threaded holes 142c. Furthermore, the guide portion 143 is provided with three cylindrically shaped portions 143b each having a guide hole 143a.

As shown in FIG. 9, a projection lens 105 for projecting an image onto a screen or the like is fitted in the circular lens-attaching hole portion 141a of the casting 104. Further, a tubular light tunnel 106 is fixed in the slot portion 142a (see FIG. 10) of the casting 104 by means of a light tunnel clip 107, as shown in FIG. 11. The light tunnel 106 has an inlet portion 106a through which the light from the light source section 103 (see FIG. 9) enters. The light tunnel 106 has the function of shaping the form of the light which entered the inlet portion 106a. Further, in order to shape the light into a rectangular form, the light tunnel 106 is constructed to form a tubular tetrahedron by means of four reflecting mirrors, and such that a mirror section is disposed inside it.

In addition, as shown in FIGS. 11 and 12, the light tunnel clip 107 has leaf spring-shaped first pressing portions 107a for pressing an upper surface of the light tunnel 106 and leaf spring-shaped second pressing portions 107b for pressing one side surface thereof. Further, guide holes 107c and screw hole portions 107d are respectively provided in regions of the light tunnel clip 107 corresponding to the positioning bosses 142b and the threaded holes 142c (see FIG. 10) of the casting 104. In addition, an opening 107e is provided in a region of the light tunnel clip 107 corresponding to the inlet portion 106a of the light tunnel 106. Further, the positioning bosses 142b of the casting 104 are respectively inserted in the two guide holes 107c of the light tunnel clip 107. Furthermore, the light tunnel clip 107 is attached to the casting 104 by means of screws 142d through the two screw hole portions 107d of the light tunnel clip 107. In consequence, the light tunnel 106 is fixed by the pressing forces of the first pressing portions 107a and the second pressing portions 107b of the light tunnel clip 107.

In addition, as shown in FIG. 9, a lamp case holder 108 is provided in the light source section 103. This lamp case holder 108 is provided with two threaded holes 108a. A lamp case 109 is accommodated in the lamp case holder 108. This lamp case 109 is provided with two screw hole portions 109a. Further, the lamp case 109 is attached to the lamp case holder 108 by means of screws 108b through the two screw hole portions 109a of the lamp case 109.

In addition, positioning bosses 109b for positioning the lamp case 109 with respect to the casting 104 are provided on a surface of the lamp case 109 on the projection section 102 side. Each positioning boss 109b of the lamp case 109 has a substantially cruciform shape as viewed in the direction of arrow P shown in FIG. 13. In addition, the positioning bosses 109b of the lamp case 109 are disposed at positions respectively corresponding to the guide holes 143a (see FIGS. 9 and 10) of the three cylindrically shaped portions 143b of the casting 104. As the lamp case 109 is fixed to the lamp case holder 108 with the screws 108b in a state in which the three positioning bosses 109b of the lamp case 109 are respectively inserted in the guide holes 143a, the lamp case 109 is fixed in a state of being positioned with respect to the casting 104.

As shown in FIG. 9, a light source lamp 110 is fitted in the lamp case 109. This light source lamp 110 is formed by a light source 110a and a concave reflector 10b, as shown in FIGS. 14 and 15. Further, as the light 110c produced by the light source 110a is reflected by the concave reflector 110b, the light is focused into a central portion of the inlet portion 106a of the light tunnel 106 fitted in the casting 104.

Here, with the conventional projector using the light source lamp 110, when the operating time of the projector reaches a predetermined time, the power of the light source lamp 110 declines, so that it is necessary to replace the light source lamp 110. In the case where the light source lamp 110 of the conventional projector is replaced, a user needs to replace the light source lamp 110 including the lamp case 109 shown in FIG. 9.

SUMMARY OF THE INVENTION

Conventionally, however, when the user replaces the lamp case 109, there have been cases where the fastening of the lamp case 109 to the lamp case holder 108 with the screws 108b is insufficient. In that case, since the projector is used in the state in which the lamp case 109 is not completely fixed, a drawback occurs in that the position of the lamp case 109 with respect to the lamp case holder 108 is offset. For this reason, there has been a problem in that the luminance declines since the optical axis of the light source lamp 110 fitted in the lamp case 109 is also offset. Also, there has been a drawback in that if the optical axis of the light source lamp 110 is offset, the emergent light from the light source lamp 110 enters a region other than the inlet portion 106a of the light tunnel 106. Inconsequence, there has been a problem in that the light source lamp 110 breaks due to the fact that the emergent light from the light source lamp 110 which entered the region other than the inlet portion 106a of the light tunnel 106 is reflected toward the light source lamp 110 side.

In addition, in a case where the projector is installed on a ceiling, when the lamp case 109 is replaced, the user needs to perform the screw fastening operation with one hand, while pushing the lamp case 109 against the lamp case holder 108 with the other hand. For this reason, there has been a problem in that in the case where the user inadvertently releases the hand holding the lamp case 109 in the state in which the screw fastening is incomplete, there is a possibility of the lamp case 109 dropping.

In addition, also with respect to the projector disclosed in JP-A-2001-215618, in the same way as the conventional projector shown in FIG. 9, since a measure for preventing the positional offset of the light source lamp at the time of replacing the light source lamp is not adopted, problems similar to those of the conventional projector shown in FIG. 9 occurs. Namely, there are problems in that at the time of replacement of the light source lamp, in the case where the fastening of the light source lamp with the screws or the like is insufficient, a decline in luminance and breakage of the light source lamp due to the reflected light can occur owing to the offset of the optical axis of the light source lamp.

The invention has been devised to overcome the above-described problems, and an object of the invention is to provide a projector which is capable of suppressing a decline in luminance and breakage of the light source lamp ascribable to the positional offset of the lamp case or the light source lamp.

To attain the above object, in accordance with a first aspect of the invention there is provided a projector including a lamp case made of resin in which a light source lamp is fitted, and an optical part holder made of metal in which an optical part is fitted. Preferably, the lamp case includes a positioning boss, the optical part holder includes a lamp case holder made of resin which accommodates the lamp case, a tubular light tunnel which shapes a form of light emitted from the light source lamp, a cylindrically shaped portion having a guide hole into which the positioning boss is inserted, and a detent member being resiliently deformable, a light-tunnel fixing member made of metal is attached to the optical part holder, the light-tunnel fixing member fixing the light tunnel to the optical part holder, the detent member is substantially U-shaped and is provided integrally on the light-tunnel fixing member so as to be disposed at a position corresponding to the cylindrically shaped member, the cylindrically shaped portion has a slot portion into which the detent member is inserted and which extends from an outer peripheral surface of the cylindrically shaped portion to the guide hole, and the positioning boss has a concave engaging portion which is engaged with the detent member when the positioning boss is inserted in the guide hole.

In the projector according to the above-described first aspect, the plurality of detent members are provided at positions respectively corresponding to the plurality of guide holes of the optical part holder, and the slot portions into which the detent members are inserted are respectively provided in the plurality of cylindrically shaped portions provided on the optical part holder and having the guide holes, as described above. At the same time, the concave engaging portions, for engaging the detent members inserted in the slot portions of the cylindrically shaped portions when the positioning bosses are inserted in the guide holes of cylindrically shaped portions of the optical part holder, are respectively provided in the plurality of positioning bosses of the lamp case. Thus, in a case where the lamp case with the light source lamp fitted therein is replaced, as the detent members and the concave engaging portions of the positioning bosses of the lamp case are engaged with each other, the lamp case can be temporarily fixed in a state of being positioned with respect to the optical part holder. For this reason, even if the lamp case has not been completely fixed with screws, the lamp case is not offset. As a result, since the optical axis of the light source lamp fitted in the lamp case is also not offset, it is possible to prevent the emergent light from the light source lamp from entering a region other than an inlet portion of the light tunnel. As a result, it is possible to suppress a decline in luminance, and prevent the light source lamp from breaking due to the fact that the emergent light from the light source lamp which entered the region other than the inlet portion of the light tunnel is reflected toward the light source lamp side. In addition, since the lamp case is temporarily fixed when the lamp case is fixed with the screws, the operation of replacing the lamp case can be performed easily. It should be noted that in the case of replacing the lamp case of the projector installed on a ceiling, at the time of the operation of fixing the lamp case with the screws, the lamp case can be prevented from dropping by virtue of the temporary fixation by the detent members and the concave engaging portions. Therefore, the invention is particularly effective.

In addition, in the projector according to the first aspect, since the detent member is constructed to be resiliently deformable, at the time of inserting the positioning boss of the lamp case into the guide hole of the cylindrically shaped portion of the optical part holder, the detent member is resiliently deformable when the positioning boss abuts against the detent member. Hence, the positioning boss can be inserted sufficiently into the guide hole. In consequence, the concave engaging portion of the positioning boss and the detent member can be easily engaged with each other. In addition, since the detent member is constructed to be substantially U-shaped, the resistance which the positioning boss receives from the detent member can be reduced when the positioning boss of the lamp case is inserted into the guide hole of the cylindrically shaped portion of the optical part holder. In consequence, the positioning boss can be easily inserted into the guide hole, and the concave engaging portion of the positioning boss and the substantially U-shaped detent member can be easily engaged with each other. In addition, the slot portion, which extends from the outer peripheral surface of the cylindrically shaped portion to the guide hole and into which the detent member is inserted, is provided in the cylindrically shaped portion of the optical part holder. Therefore, the detent member can be easily engaged with the concave engaging portion of the positioning boss of the lamp case inserted in the guide hole of the cylindrically shaped portion. Furthermore, since the detent members are integrally provided on the light-tunnel fixing member, even if the detent members are provided, the number of parts does not increase.

In accordance with a second aspect of the invention there is provided a projector including a lamp case in which a light source lamp is fitted, and an optical part holder in which an optical part is fitted. Preferably, the lamp case includes a positioning boss having a concave engaging portion, the optical part holder has a guide hole into which the positioning boss is inserted and a protruding detent member, and the protruding detent member is disposed at a position corresponding to the guide hole and is engaged with the concave engaging portion when the positioning boss is inserted in the guide hole.

In the projector according to the above-described second aspect, the detent member is disposed at a position corresponding to the guide hole of the optical part holder, and the concave engaging portion, which engages the detent member when the positioning boss is inserted in the guide hole of the optical part holder, is provided on the positioning boss of the lamp case, as described above. Thus, in the case where the lamp case with the light source lamp fitted therein is replaced, as the detent member and the concave engaging portion of the positioning boss of the lamp case are engaged with each other, the lamp case can be temporarily fixed in a state of being positioned with respect to the optical part holder. For this reason, even if the lamp case has not been completely fixed with screws, the lamp case is not offset. As a result, since the optical axis of the light source lamp fitted in the lamp case is also not offset, it is possible to prevent the emergent light from the light source lamp from entering a region other than the inlet portion of the light tunnel when the form of the emergent light from the light source lamp is shaped by the light tunnel. As a result, it is possible to suppress a decline in luminance, and prevent the light source lamp from breaking due to the fact that the emergent light from the light source lamp which entered the region other than the inlet portion of the light tunnel is reflected toward the light source lamp side. In addition, since the lamp case is temporarily fixed when the lamp case is fixed with the screws, the operation of replacing the lamp case can be performed easily. It should be noted that in the case of replacing the lamp case of the projector installed on a ceiling, at the time of the operation of fixing the lamp case with the screws, the lamp case can be prevented from dropping by virtue of the temporary fixation by the detent member and the concave engaging portion. Therefore, the invention is particularly effective.

BRIEF DESCRIPTION OF THE DRAWINGS

Preferred embodiments of the present invention will be described in detail based on the following figures, wherein.

DETAILED DESCRIPTION OF THE INVENTION

Hereafter, a description will be given of the embodiments of the invention with reference to the drawings.

Figure 1:
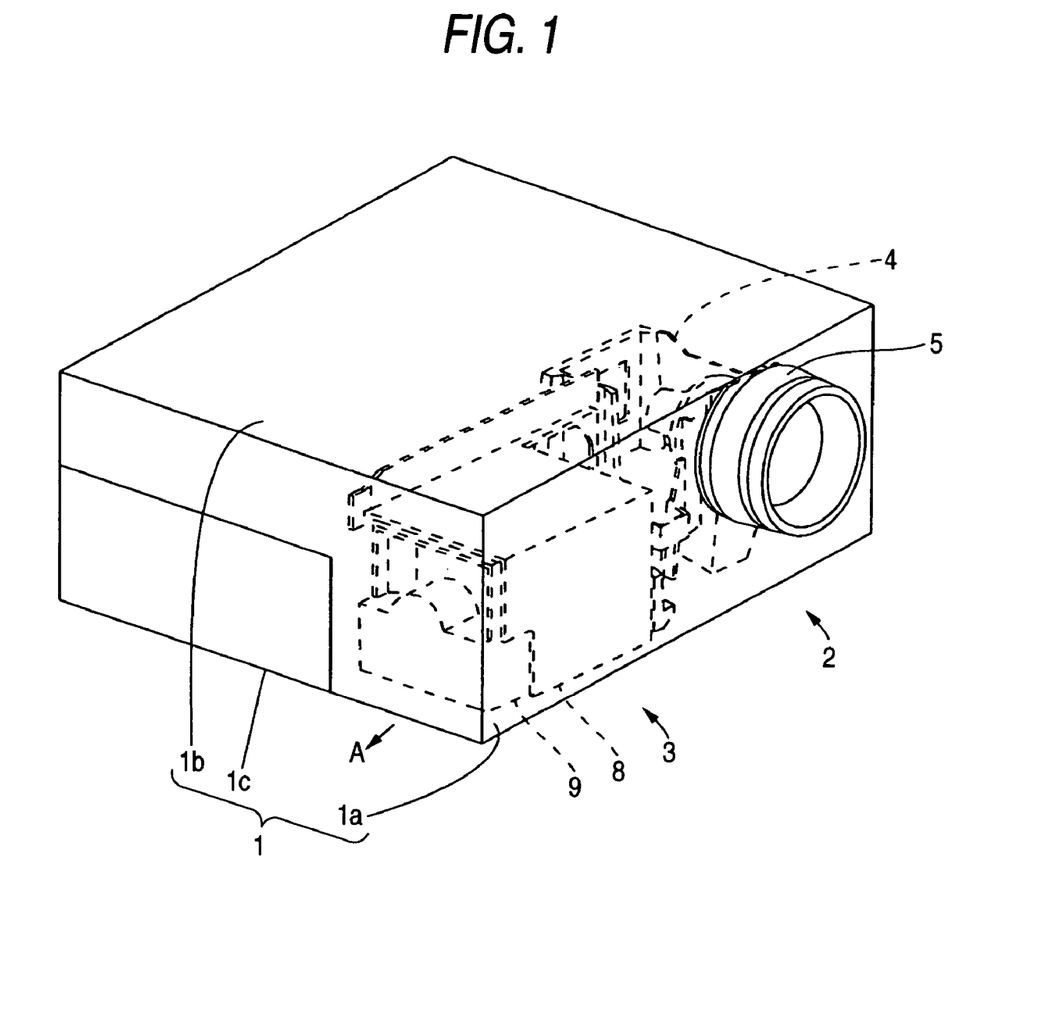
FIG. 1 is a perspective view illustrating a projector in accordance with an embodiment of the invention.
Figure 2:
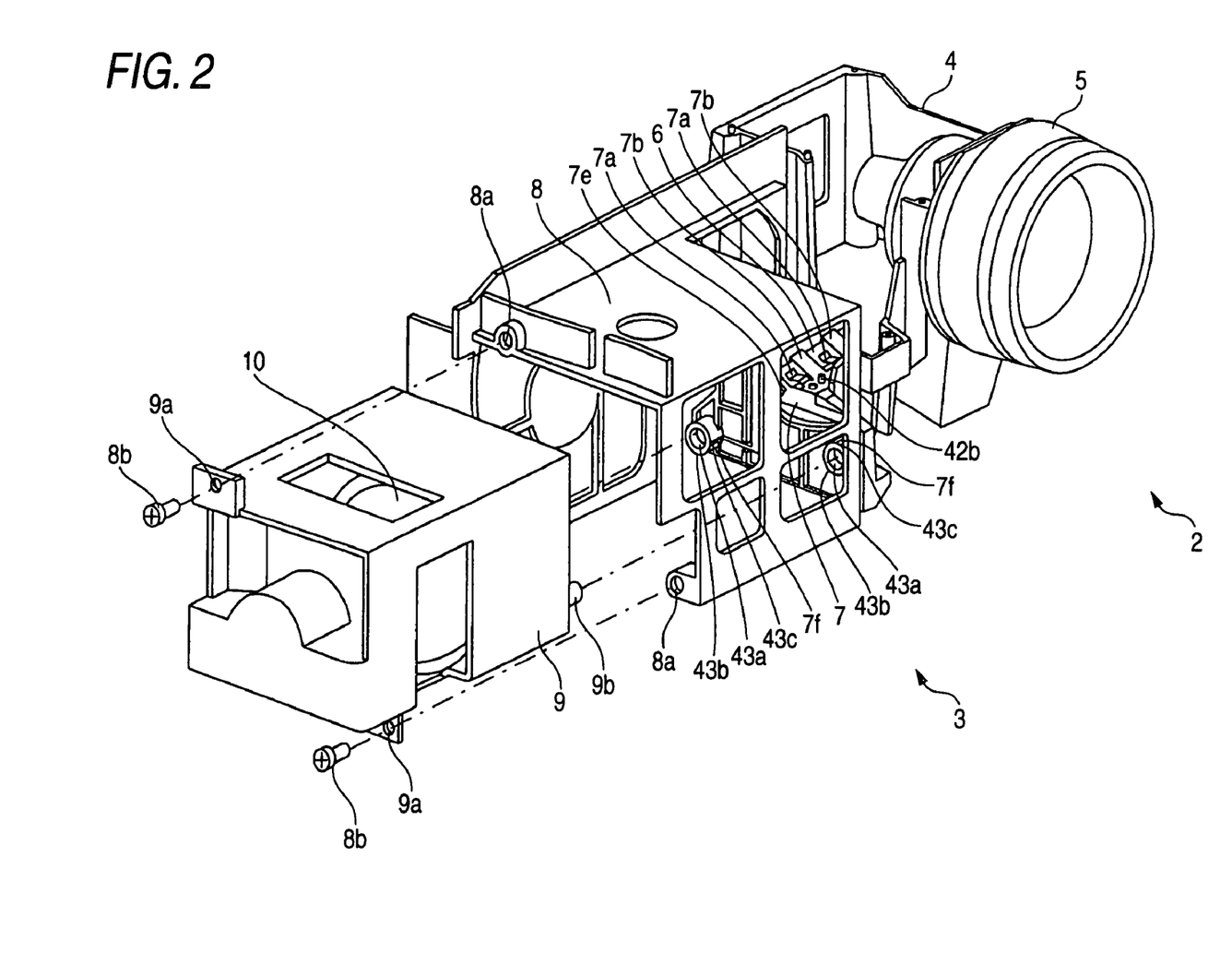
FIG. 2 is an exploded perspective view of a projection section and a light source section of the projector in accordance with the embodiment shown in FIG. 1.
Figure 3:
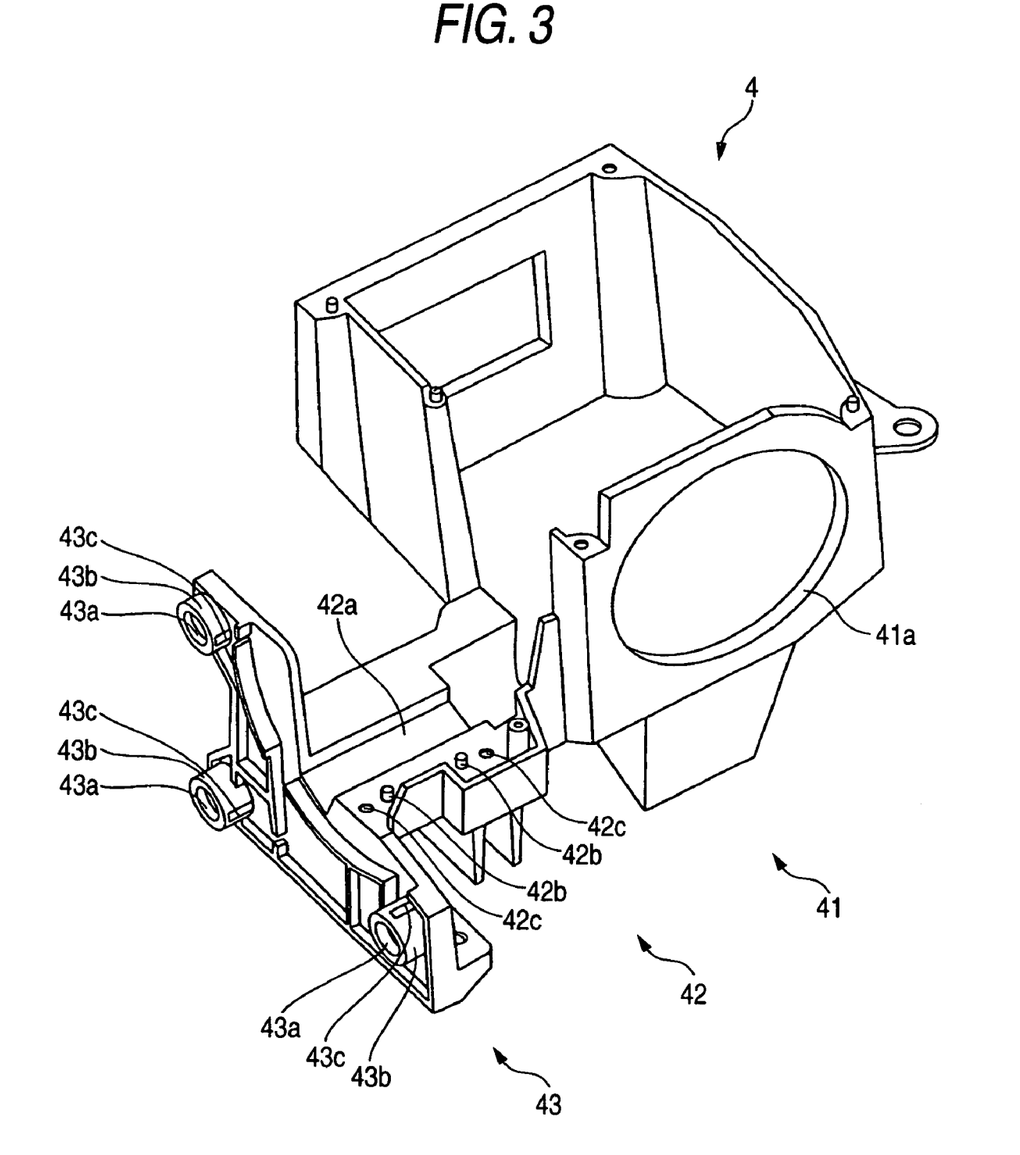
FIG. 3 is a perspective view of a casting of the projection section shown in FIG. 2.
Figure 4:
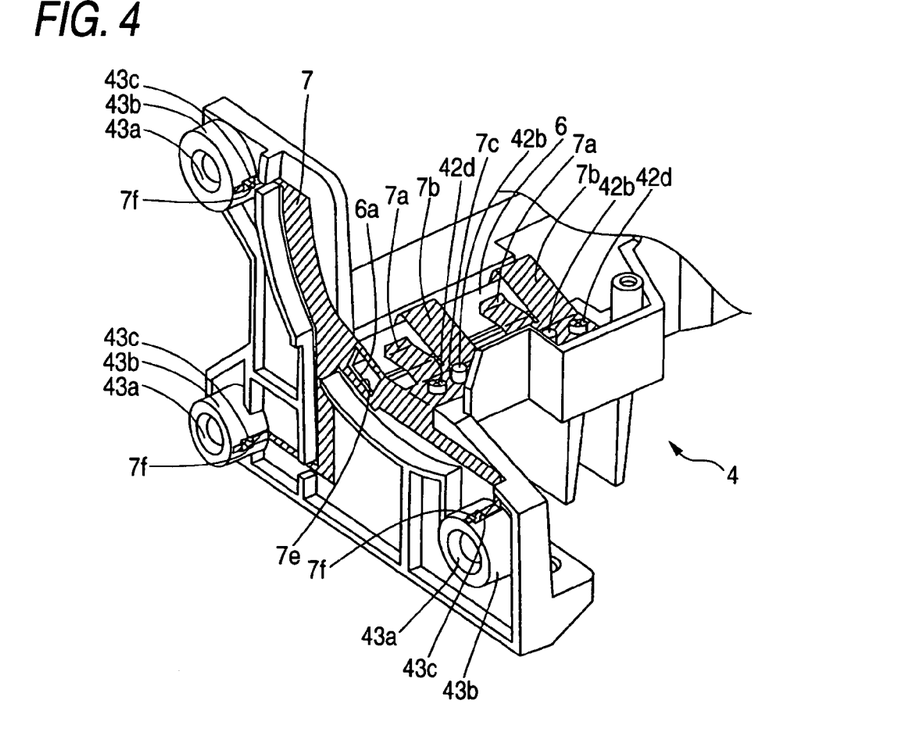
FIG. 4 is an enlarged perspective view of a light tunnel and its vicinities of the projection section shown in FIG. 2.
Figure 5:
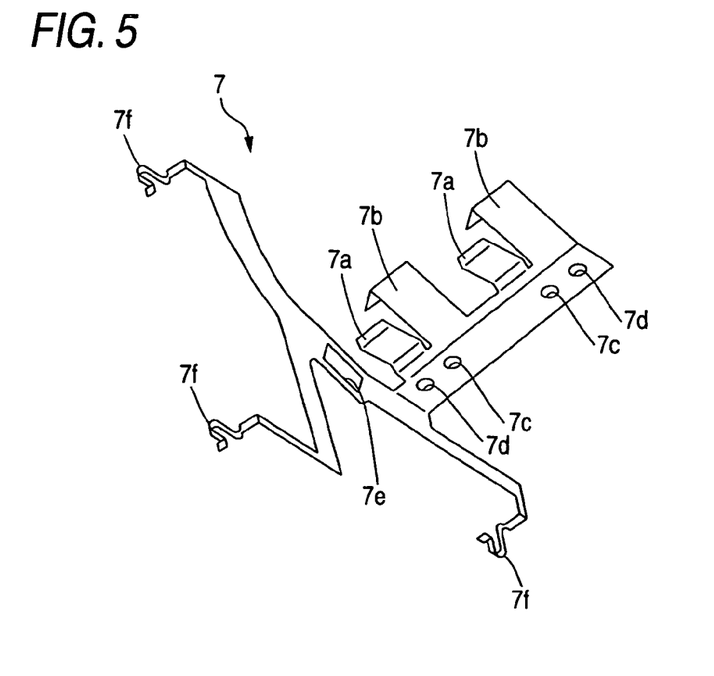
FIG. 5 is a perspective view of a light tunnel clip of the projection section shown in FIG. 2.
Figure 6:
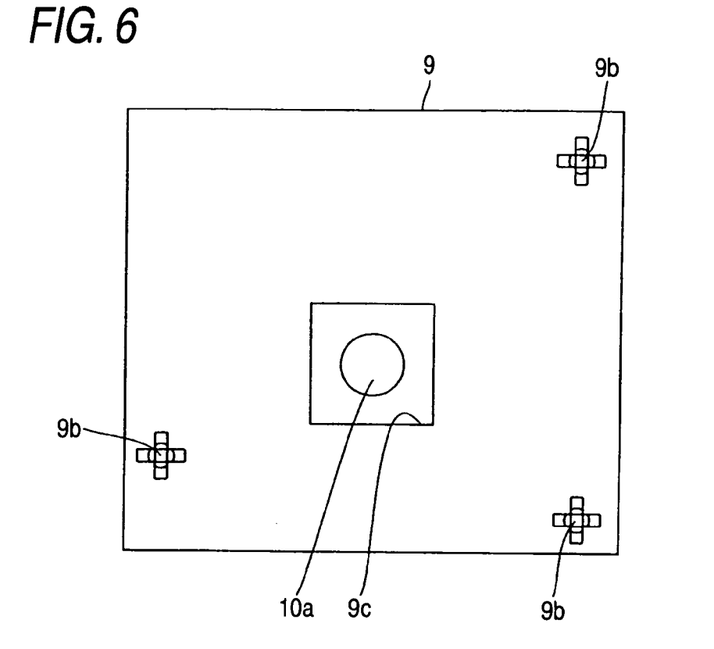
FIG. 6 is a plan view of a lamp case of the light source section shown in FIG. 2.
Figure 7:
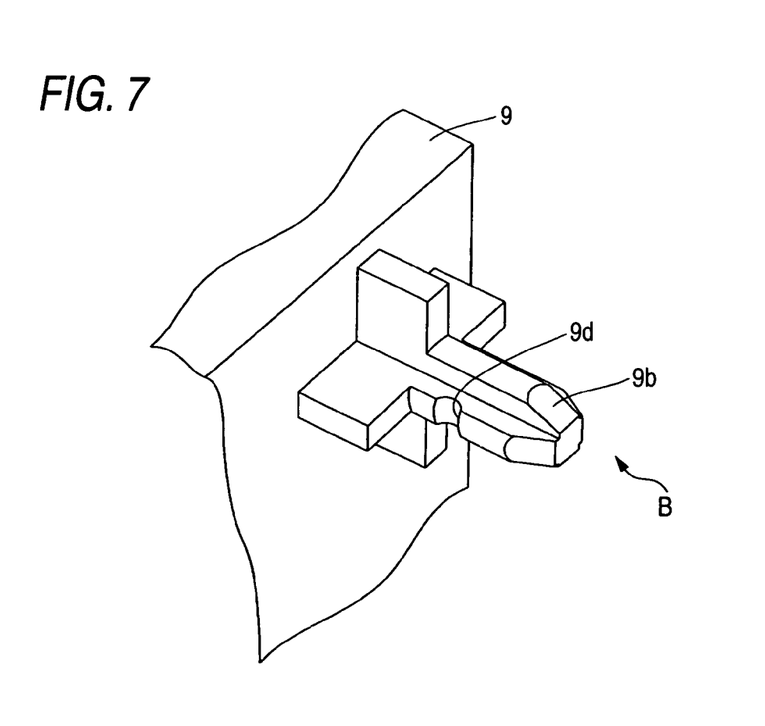
FIG. 7 is an enlarged perspective view of a positioning boss of the lamp case shown in FIG. 6.
Figure 8:
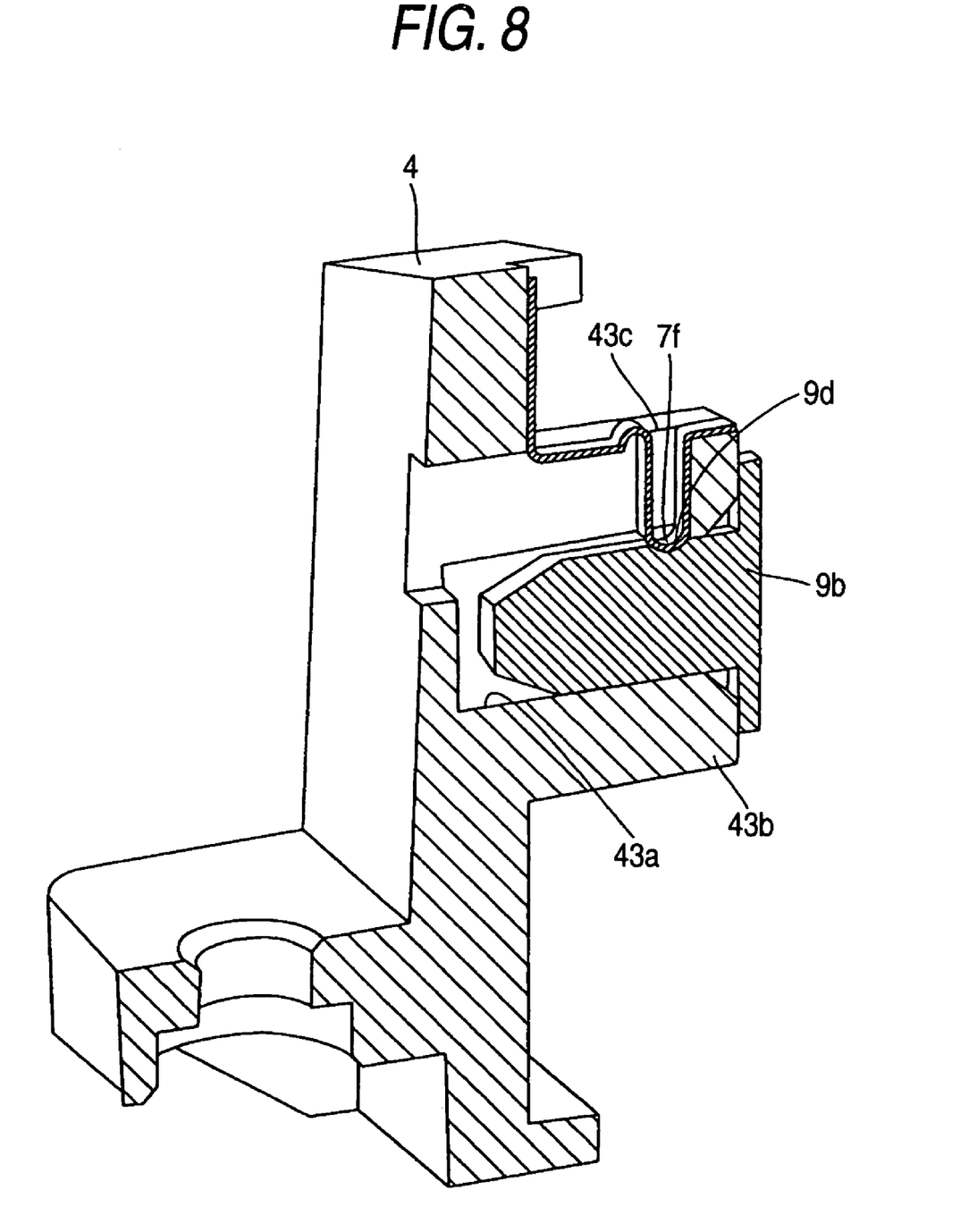
FIG. 8 is a cross-sectional view for explaining a state in which the positioning boss of the lamp case is inserted in a guide hole of the casting.

FIG. 1 is a perspective view illustrating a projector in accordance with an embodiment of the invention. FIG. 2 is an exploded perspective view of a projection section and a light source section of the projector in accordance with the embodiment shown in FIG. 1. FIG. 3 is a perspective view of a casting of the projection section shown in FIG. 2. FIG. 4 is an enlarged perspective view of a light tunnel and its vicinities of the projection section shown in FIG. 2. FIG. 5 is a perspective view of a light tunnel clip of the projection section shown in FIG. 2. FIG. 6 is a plan view of a lamp case of the light source section shown in FIG. 2. FIG. 7 is an enlarged perspective view of a positioning boss of the lamp case shown in FIG. 6. FIG. 8 is a cross-sectional view for explaining a state in which the positioning boss of the lamp case is inserted in a guide hole of the casting. Referring to FIGS. 1 to 8, a description will be given of the structure of the projector in accordance with this embodiment. It should be noted that in this embodiment a description will be given of a projector of a DLP (Digital Light Processing) system using a DMD (Digital Micromirror Device).

As shown in FIG. 1, the projector in accordance with this embodiment has a projection section 2 and a light source section 3 provided inside an exterior case 1. The exterior case 1 is formed by a front case 1a, an upper case 1b, and a lower case 1c. The front case 1a is provided to cover a front portion of a main body. Further, the upper case 1b is provided to cover an upper portion of the main body and regions of side portions corresponding to the light source section 3. Furthermore, the lower case 1c is provided to cover a lower portion of the main body and regions of the side portions other than the region corresponding to the light source section 3.

As shown in FIG. 2, a casting 4 made of magnesium is provided in a region of the lower case 1c corresponding to the projection section 2. It should be noted that the casting 4 is an example of "an optical part holder" in accordance with the invention. As shown in FIG. 3, this casting 4 has a lens mounting portion 41, a light tunnel fitting portion 42, and a guide portion 43. The lens mounting portion 41 is provided with a circular lens-attaching hole portion 41a. Further, the light tunnel fitting portion 42 is provided with a slot portion 42a having side surfaces and a bottom surface inclined by a predetermined angle, two positioning bosses 42b, and two threaded holes 42c. Furthermore, the guide portion 43 is provided with three cylindrically shaped portions 43b each having a guide hole 43a.

Here, in this embodiment, each of the three cylindrically shaped portions 43b of the casting 4 has a slot portion 43c extending from an outer peripheral surface of the cylindrically shaped portion 43b to the guide hole 43a.

As shown in FIG. 2, a projection lens 5 for projecting an image onto a screen or the like is fitted in the circular lens-attaching hole portion 41a of the casting 4. Further, a tubular light tunnel 6 is fixed in the slot portion 42a (see FIG. 3) of the casting 4 by means of a light tunnel clip 7, as shown in FIG. 4. The light tunnel 6 has an inlet portion 6a through which the light from the light source section 3 (see FIG. 2) enters. The light tunnel 6 has the function of shaping the form of the light which entered the inlet portion 6a. Further, in order to shape the light into a rectangular form, the light tunnel 6 is constructed to form a tubular tetrahedron by means of four reflecting mirrors, and such that a mirror section is disposed inside it. It should be noted that the light tunnel clip 7 is an example of "a light-tunnel fixing member" in accordance with the invention.

In addition, as shown in FIGS. 4 and 5, the light tunnel clip 7 has leaf spring-shaped first pressing portions 7a for pressing an upper surface of the light tunnel 6 and leaf spring-shaped second pressing portions 7b for pressing one side surface thereof. Further, guide holes 7c and screw hole portions 7d are respectively provided in regions of the light tunnel clip 7 corresponding to the positioning bosses 42b and the threaded holes 42c (see FIG. 3) of the casting 4. In addition, an opening 7e is provided in a region of the light tunnel clip 7 corresponding to the inlet portion 6a of the light tunnel 6. Further, the positioning bosses 42b of the casting 4 are respectively inserted in the two guide holes 7c of the light tunnel clip 7. Furthermore, the light tunnel clip 7 is attached to the casting 4 by means of screws 42d through the two screw hole portions 7d of the light tunnel clip 7. In consequence, the light tunnel 6 is fixed by the pressing forces of the first pressing portions 7a and the second pressing portions 7b of the light tunnel clip 7.

Here, in this embodiment, three detent members 7f which are substantially U-shaped and are resiliently deformable are integrally provided in the light tunnel clip 7. As shown in FIG. 4, these three detent members 7f are disposed at positions respectively corresponding to the three cylindrically shaped portions 43b provided on the casting 4 and having the guide holes 43a, and are inserted in the slot portions 43c of the cylindrically shaped portions 43b.

In addition, as shown in FIG. 2, a resin-made lamp case holder 8 is provided in a region of the lower case 1c (see FIG. 1) corresponding to the light source section 3. This lamp case holder 8 is provided with two threaded holes 8a. A resin-made lamp case 9 having a light source lamp 10 fitted therein is accommodated in the lamp case holder 8. This lamp case 9 is provided with two screw hole portions 9a. Further, the lamp case 9 is attached to the lamp case holder 8 by means of screws 8b through the two screw hole portions 9a of the lamp case 9.

In addition, as shown in FIGS. 6 and 7, three positioning bosses 9b for positioning the lamp case 9 with respect to the casting 4 (see FIG. 2) are provided on a surface of the lamp case 9 on the projection section 2 side. Each of the three positioning bosses 9b of the lamp case 9 has a substantially cruciform shape as viewed in the direction of arrow B shown in FIG. 7. In addition, the three positioning bosses 9b of the lamp case 9 are disposed at positions respectively corresponding to the guide holes 43a (see FIGS. 2 and 4) of the cylindrically shaped portions 43b of the casting 4, and are inserted in the guide holes 43a. In consequence, the lamp case 9 is positioned with respect to the casting 4. In addition, a hole portion 9c through which the light from a light source 10a of the light source lamp 10 is emergent is provided in a side surface of the lamp case 9 on the projection section 2 side. Then, the light emergent from the light source lamp 10 is focused into a central portion of the inlet portion 6a (see FIG. 4) of the light tunnel 6 fitted in the casting 4.

Here, in this embodiment, the three positioning bosses 9b of the lamp case 9 respectively have concave engaging portions 9d, as shown in FIGS. 7 and 8. When the positioning boss 9b is inserted in the guide hole 43a of the cylindrically shaped portion 43b of the casting 4, this concave engaging portion 9d is engaged with the substantially U-shaped detent member 7f inserted in the slot portion 43c of the cylindrically shaped portion 43b. In consequence, the positioning boss 9b inserted in the guide hole 43a of the cylindrically shaped portion 43b is engaged with the detent member 7f by means of the concave engaging portion 9d of the positioning boss 9b.

In this embodiment, since the detent members 7f are integrally provided on the light tunnel clip 7, as described above, even if the detent members 7f are provided, the number of parts does not increase.

Referring next to FIGS. 1, 2, and 8, a description will be given of the operation at the time of replacing the lamp case 9 with the light source lamp 10 fitted therein. First, the upper case 1b shown in FIG. 1 is removed. Consequently, the light source section 3 is in an exposed state. In this state, by removing the screws 8b shown in FIG. 2, the lamp case 9 with the old light source lamp 10 fitted therein is pulled out in the direction of arrow A. Then, the lamp case 9 with a new light source lamp 10 fitted therein is accommodated in the lamp case holder 8. At this juncture, the positioning bosses 9b on the lamp case 9 are inserted in the guide holes 43a of the cylindrically shaped portions 43b of the casting 4.

At this time, in this embodiment, as shown in FIG. 8, the concave engaging portion 9d of each positioning boss 9b on the lamp case 9 is engaged with the substantially U-shaped detent member 7f inserted in the slot portion 43c of the cylindrically shaped portion 43b of the casting 4. In consequence, the lamp case 9 is temporarily engaged with the casting 4. Subsequently, the lamp case 9 is fixed to the lamp case holder 8 with the screws 8b through the two screw hole portions 9a of the lamp case 9, as shown in FIG. 2.

In this embodiment, as described above, the three detent members 7f are provided at positions respectively corresponding to the three guide holes 43a of the casting 4, and the slot portions 43c, into which the detent members 7f are inserted, are respectively provided in the three cylindrically shaped portions 43b provided on the casting 4 and having the guide holes 43a. At the same time, the concave engaging portions 9d, for engaging the detent members 7f inserted in the slot portions 43c of the cylindrically shaped portions 43b when the positioning bosses 9b are inserted in the guide holes 43a of the casting 4, are respectively provided in the three positioning bosses 9b of the lamp case 9. Thus, in the case where the lamp case 9 with the light source lamp 10 fitted therein is replaced, as the detent members 7f and the concave engaging portions 9d of the positioning bosses 9b of the lamp case 9 are engaged with each other, the lamp case 9 can be temporarily fixed in a state of being positioned with respect to the casting 4. For this reason, even if the lamp case 9 has not been completely fixed with the screws 8b, the lamp case 9 is not offset. As a result, since the optical axis of the light source lamp 10 fitted in the lamp case 9 is also not offset, it is possible to prevent the emergent light from the light source lamp 10 from entering a region other than the inlet portion 6a of the light tunnel 6. As a result, it is possible to suppress a decline in luminance, and prevent the light source lamp 10 from breaking due to the fact that the emergent light from the light source lamp 10 which entered the region other than the inlet portion 6a of the light tunnel 6 is reflected toward the light source lamp 10 side.

In addition, in this embodiment, since the lamp case 9 is temporarily fixed when the lamp case 9 is fixed with the screws 8b, the operation of replacing the lamp case 9 can be performed easily. Particularly in the case of replacing the lamp case 9 of the projector installed on a ceiling, at the time of the operation of fixing the lamp case 9 with the screws 8*b*, the lamp case 9 can be prevented from dropping by virtue of the temporary fixation by the detent members 7*f* and the concave engaging portions 9*d*.

In addition, in this embodiment, since the detent member 7*f* is constructed to be resiliently deformable, at the time of inserting the positioning boss 9*b* of the lamp case 9 into the guide hole 43*a* of the casting 4, the detent member 7*f* is resiliently deformable when the positioning boss 9*b* abuts against the detent member 7*f*. Hence, the positioning boss 9*b* can be inserted sufficiently into the guide hole 43*e*. In consequence, the concave engaging portion 9*d* of the positioning boss 9*b* and the detent member 7*f* can be easily engaged with each other. In addition, since the detent member 7*f* is constructed to be substantially U-shaped, the resistance which the positioning boss 9*b* receives from the detent member 7*f* can be reduced when the positioning boss 9*b* of the lamp case 9 is inserted into the guide hole 43*a* of the casting 4. In consequence, the positioning boss 9*b* can be easily inserted into the guide hole 43*a*, and the concave engaging portion 9*d* of the positioning boss 9*b* and the substantially U-shaped detent member 7*f* can be easily engaged with each other. In addition, the slot portion 43*c*, which extends from the outer peripheral surface of the cylindrically shaped portion 43*b* to the guide hole 43*a* and into which the detent member 7*f* is inserted, is provided in the cylindrically shaped portion 43*b* of the casting 4. Therefore, the detent member 7*f* can be easily engaged with the concave engaging portion 9*d* of the positioning boss 9*b* of the lamp case 9 inserted in the guide hole 43*a* of the cylindrically shaped portion 43*b*.

It should be appreciated that the embodiment disclosed herein is described by way of illustration, not by way of limitation in all aspects. The scope of the invention is defined not by the embodiment above but by the claims, and is intended to cover all modifications and variations within the equivalent meaning and scope of the claims.

For example, although in the above-described embodiment the detent member 7*f* is integrally provided on the tunnel clip 7 so as to be disposed at a position corresponding to the guide hole 43*a* of the casting 4, the invention is not limited to the same. For example, insofar as the detent member is disposed at a position corresponding to the guide hole of the casting, the detent member may not be provided integrally on the tunnel clip. For instance, a single detent member may be attached in a vicinity of the guide hole of the casting.

In addition, although in the above-described embodiment the detent member 7*f* is constructed to be resiliently deformable, the invention is not limited to the same, and a detent member which is not resiliently deformable may be used.

In addition, although in the above-described embodiment the detent member 7*f* is constructed to be substantially U-shaped, the invention is not limited to the same, and the detent member may be constructed in a protruding shape other than the U-shape insofar as it has a shape for engaging the concave engaging portion of the positioning boss of the lamp case.

In addition, although in the above-described embodiment the cylindrically shaped portions 43*b* each having the guide hole 43*a* are provided on the casting 4, and the slot portion 43*c* into which the detent member 7*f* is inserted is provided in each of the cylindrically shaped portions 43*b*, the invention is not limited to the same. For example, only the guide holes may be provided in the casting.

What is claimed is:

1. A projector comprising:
a lamp case made of resin in which a light source lamp is fitted; and
an optical part holder made of metal in which an optical part is fitted;
wherein
the lamp case includes a positioning boss,
the optical part holder includes:
a lamp case holder made of resin which accommodates the lamp case;
a tubular light tunnel which shapes a form of light emitted from the light source lamp;
a cylindrically shaped portion having a guide hole into which the positioning boss is inserted; and
a detent member being resiliently deformable,
a light-tunnel fixing member made of metal is attached to the optical part holder, the light-tunnel fixing member fixing the light tunnel to the optical part holder,
the detent member is substantially U-shaped and is provided integrally on the light-tunnel fixing member so as to be disposed at a position corresponding to the cylindrically shaped member,
the cylindrically shaped portion has a slot portion into which the detent member is inserted and which extends from an outer peripheral surface of the cylindrically shaped portion to the guide hole, and
the positioning boss has a concave engaging portion which is engaged with the detent member when the positioning boss is inserted in the guide hole.

2. A projector comprising:
a lamp case in which a light source lamp is fitted; and
an optical part holder in which an optical part is fitted;
wherein
the lamp case includes a positioning boss having a concave engaging portion,
the optical part holder has a guide hole into which the positioning boss is inserted and a protruding detent member, and
the protruding detent member is disposed at a position corresponding to the guide hole and is engaged with the concave engaging portion when the positioning boss is inserted in the guide hole.

3. The projector according to claim 2,
wherein the protruding detent member has a resiliently deformable structure.

4. The projector according to claim 3,
wherein the protruding detent member is substantially U-shaped.

5. The projector according to claim 4,
wherein the guide hole is provided in a tubular portion projecting from a surface of the optical part holder, and
the tubular portion has a slot portion which extends from an outer peripheral surface of the tubular portion to the guide hole and into which the protruding detent member is inserted.

6. The projector according to claim 5, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

7. The projector according to claim 4, further comprising:
a light tunnel which shapes a form of light emitted from the light source lamp; and
a light-tunnel fixing member which fixes the light tunnel to the optical part holder, wherein the protruding detent member is provided integrally on the light-tunnel fixing member.

8. The projector according to claim 3,
wherein the guide hole is provided in a tubular portion projecting from a surface of the optical part holder, and
the tubular portion has a slot portion which extends from an outer peripheral surface of the tubular portion to the guide hole and into which the protruding detent member is inserted.

9. The projector according to claim 8, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

10. The projector according to claim 3, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

11. The projector according to claim 2,
wherein the protruding detent member is substantially U-shaped.

12. The projector according to claim 11,
wherein the guide hole is provided in a tubular portion projecting from a surface of the optical part holder, and
the tubular portion has a slot portion which extends from an outer peripheral surface of the tubular portion to the guide hole and into which the protruding detent member is inserted.

13. The projector according to claim 12, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

14. The projector according to claim 11, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

15. The projector according to claim 2,
wherein the guide hole is provided in a tubular portion projecting from a surface of the optical part holder, and
the tubular portion has a slot portion which extends from an outer peripheral surface of the tubular portion to the guide hole and into which the protruding detent member is inserted.

16. The projector according to claim 15, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

17. The projector according to claim 2, further comprising:
a light tunnel which shapes a form of light emitted from the light source lamp; and
a light-tunnel fixing member which fixes the light tunnel to the optical part holder,
wherein the protruding detent member is provided integrally on the light-tunnel fixing member.

* * * * *